(12) United States Patent
Bates (10) Patent No.: US 9,104,795 B2
(45) Date of Patent: *Aug. 11, 2015

(54) INTEGRATING COMPILER WARNINGS INTO A DEBUG SESSION

(75) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 403 days.

This patent is subject to a terminal disclaimer.

(21) Appl. No.: 13/170,754

(22) Filed: Jun. 28, 2011

(65) Prior Publication Data

US 2013/0007717 A1   Jan. 3, 2013

(51) Int. Cl.
  *G06F 9/44* (2006.01)
  *G06F 9/45* (2006.01)
  *G06F 11/36* (2006.01)

(52) U.S. Cl.
  CPC .......... *G06F 11/362* (2013.01); *G06F 11/3624* (2013.01); *G06F 8/41* (2013.01); *G06F 11/3656* (2013.01)

(58) Field of Classification Search
  CPC ............. G06F 11/362; G06F 11/3624; G06F 11/3664; G06F 8/41; G06F 11/3656
  See application file for complete search history.

(56) References Cited

U.S. PATENT DOCUMENTS

| | | | |
|---|---|---|---|
| 6,256,777 B1 * | 7/2001 | Ackerman | 717/129 |
| 6,385,769 B1 * | 5/2002 | Lewallen | 717/125 |
| 7,818,729 B1 * | 10/2010 | Plum et al. | 717/140 |
| 7,886,276 B2 * | 2/2011 | Tai et al. | 717/125 |
| 8,087,002 B2 * | 12/2011 | Fjeldstad et al. | 717/124 |
| 8,689,188 B2 * | 4/2014 | Bassin et al. | 717/124 |
| 2003/0046668 A1 * | 3/2003 | Bowen | 717/131 |
| 2003/0131284 A1 * | 7/2003 | Flanagan et al. | 714/38 |
| 2003/0221185 A1 * | 11/2003 | Bates et al. | 717/125 |
| 2004/0205728 A1 * | 10/2004 | Hanson | 717/129 |
| 2004/0268312 A1 * | 12/2004 | Abe et al. | 717/124 |
| 2005/0223363 A1 * | 10/2005 | Black-Ziegelbein et al. | 717/127 |
| 2005/0283764 A1 * | 12/2005 | Chiu | 717/125 |
| 2006/0059468 A1 * | 3/2006 | Heirich | 717/125 |
| 2006/0242628 A1 * | 10/2006 | Plesko et al. | 717/131 |
| 2006/0294158 A1 * | 12/2006 | Tsyganskiy et al. | 707/202 |
| 2007/0011515 A1 * | 1/2007 | Heydarian et al. | 714/724 |
| 2007/0038982 A1 * | 2/2007 | Andrews et al. | 717/124 |

(Continued)

OTHER PUBLICATIONS

Mordechai Ben-Ari, Compile and Runtime Errors in Java, 2007, pp. 5-16.*

(Continued)

*Primary Examiner* — Thuy Dao
*Assistant Examiner* — Mongbao Nguyen
(74) *Attorney, Agent, or Firm* — Kennedy Lenart Spraggins LLP (57) ABSTRACT

Integrating compiler warnings into a debug session including: receiving, by a debugger for a debug session of a debuggee from a compiler, compiled source code for execution and compiler warning data describing one or more compiler warnings generated at compile time of the debuggee, each compiler warning resulting from a source code variable statement in the debuggee source code; receiving, by the debugger, a request to evaluate a variable; determining, from the compiler warning data, whether evaluating the variable is dependent upon a source code variable statement resulting in a compiler warning; and, if evaluating the variable is dependent upon a source code variable statement resulting in a compiler warning, returning, by the debugger responsive to the request along with a result of the evaluation, a compiler warning indicator.

9 Claims, 5 Drawing Sheets

(56) References Cited

U.S. PATENT DOCUMENTS

| | | | |
|---|---|---|---|
| 2007/0150866 A1* | 6/2007 | Bates et al. | 717/124 |
| 2007/0245240 A1* | 10/2007 | Hudson | 715/709 |
| 2007/0245316 A1* | 10/2007 | Bates et al. | 717/127 |
| 2008/0127113 A1* | 5/2008 | Wu et al. | 717/129 |
| 2009/0083719 A1* | 3/2009 | Hsieh | 717/140 |
| 2010/0192135 A1* | 7/2010 | Krishnaswamy et al. | 717/140 |
| 2010/0287539 A1* | 11/2010 | Park et al. | 717/130 |
| 2010/0313186 A1* | 12/2010 | Chiodo et al. | 717/131 |
| 2010/0325619 A1* | 12/2010 | Song et al. | 717/143 |
| 2011/0029819 A1* | 2/2011 | Mehta et al. | 714/38 |
| 2013/0074045 A1 | 3/2013 | Bates | |

OTHER PUBLICATIONS

Brian Gough, An Introduction to GCC, 2004, pp. 41-53.*

4D SA/4D, 4D Compiler, Reference Windows and Mac OS Versions, 2000, pp. 28-35 and 49-58.*

* cited by examiner

INTEGRATING COMPILER WARNINGS INTO A DEBUG SESSION

BACKGROUND OF THE INVENTION

1. Field of the Invention

The field of the invention is data processing, or, more specifically, methods, apparatus, and products for integrating compiler warnings into a debug session.

2. Description of Related Art

In today's computing environment, software programs may be actively utilized for long periods of time, well after the program's initial development. Many times these programs are recompiled for new releases even in instances where there is no development performed on the underlying software. Over time, computer languages change and a compiler's diagnostic capabilities increase. It is not uncommon to have compiler warnings in source code that software developers ignore during subsequent releases. Porting code from one platform to another platform is another instance in which compiler warning messages may arise. If the compiled and executable software application appears to function correctly once ported, many of the modules that compile with warnings may be unaltered by the software developers.

Code flagged with compiler warning messages may or may not be related to a problem in software execution, however. In some cases, such a problem may show itself a great time after compiling.

Consider, for example, a compiler warning; "Loss of precision," when a 64-bit pointer is assigned to a 32-bit integer value. If the 32-bit value is later converted into a pointer it may or may not point back to the same location as the original pointer. In practice, the software application may function exactly as expected much of the time, until the high order bytes of the 64-bit pointer are set. Once set, an incomplete value is assigned and an error arises somewhere else in the program.

Often when debugging the program a software developer has no information regarding the compiler warnings that may have been generated at compile time and no information regarding the relationship between such compiler warnings and problems identified during debugging.

SUMMARY OF THE INVENTION

Methods, apparatus, and products for integrating compiler warnings into a debug session are disclosed in the specification. Such integration of compiler warnings includes: receiving, by a debugger for a debug session of a debuggee from a compiler, compiled source code for execution and compiler warning data describing one or more compiler warnings generated at compile time of the debuggee, each compiler warning resulting from a source code variable statement in the debuggee source code; receiving, by the debugger, a request to evaluate a variable; determining, from the compiler warning data, whether evaluating the variable is dependent upon a source code variable statement resulting in a compiler warning; and, if evaluating the variable is dependent upon a source code variable statement resulting in a compiler warning, returning, by the debugger responsive to the request along with a result of the evaluation, a compiler warning indicator.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
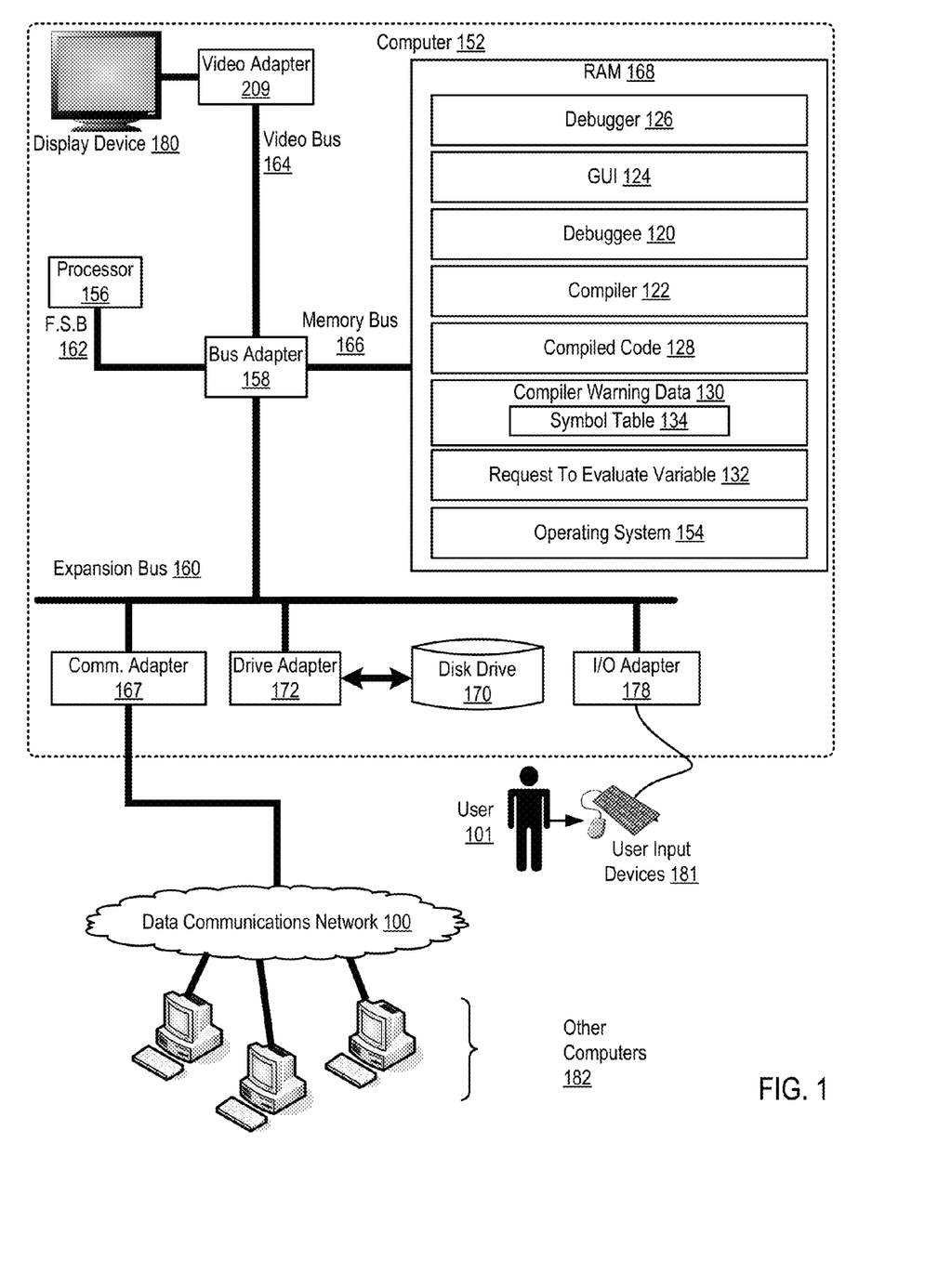
FIG. 1 sets forth a block diagram of automated computing machinery forming a system for integrating compiler warnings into a debug session according to embodiments of the present invention.

Exemplary methods, apparatus, and products for integrating compiler warnings into a debug session in accordance with the present invention are described with reference to the accompanying drawings, beginning with FIG. 1. FIG. 1 sets forth a block diagram of automated computing machinery forming a system for integrating compiler warnings into a debug session according to embodiments of the present invention. The system of FIG. 1 includes an exemplary computer (152) useful in integrating compiler warnings into a debug session according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a debugger (126). A debugger (126) is an application that controls operation of another application—the debuggee (120)—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables.

In the example system of FIG. 1, the debugger (126) presents a graphical user interface (124) as a front-end of the debugger (126). Front-ends are extensions to debugger engines that provide Integrated Development Environment ('IDE') integration, program animation, and visualization features, rather than console-based command line interfaces. The 'front-end' directly faces a client—or user—in contrast to the debugger (126) in the example of FIG. 1, which interfaces indirectly with the clients through the GUI (124).

Also stored in RAM (168) is a compiler (122). A compiler is a module of computer program instructions that transforms source code written in a programming language (the source language) into another computer language (the target language, often having a binary form known as object code). The most common transformation of source code creates an executable program. The compiler (122) of FIG. 1 is also configured to generate a debuggable program—the debuggee.

In the example of FIG. 1, the compiler (122) and the debugger (126) support integration of compiler warnings into a debug session in accordance with embodiments of the present invention. The compiler (122) operates for compiler warning integration by generating during compiling of the debuggee (120) one or more compiler warnings, each compiler warning resulting from a source code variable statement. A source code variable statement as the term is used in this specification refers to either of a variable definition or variable declaration.

The compiler (122) is also configured to generate a symbol table with a number of records. Each record in the symbol table represents a variable. A symbol table is a data structure, where each identifier in a program's source code is associated with information relating to its declaration or appearance in the source, such as its type, scope level and location. Symbol tables are often used by debuggers for variable evaluations and the like. In the example of FIG. 1, for each variable having a source code variable statement that resulted in a compiler warning, the symbol table includes a record that, in turn, includes a compiler warning flag and a warning description.

The compiler (122) is also configured to embed, in the compiled source code (128) of the debuggee at a source code variable statement resulting a compiler warning for a variable, code that, when executed, sets a tag for the variable and embed, at a source code variable statement that does not result in a compiler warning for that variable, code that clears the tag for the variable. A tag may be implemented in a variety of ways. One example implementation of a tag is a value stored in a predefined memory location for a particular variable. If the value at the predefined memory location is set to a designated value, the tag is set for the particular variable. If the value at the predefined memory location is set to any other value (not the designated value), the tag is not set for the particular variable. In another embodiment, a data structure, such as a table, may be implemented to track setting and clearing of tags for a plurality of variables.

The debugger (126) operates for compiler warning integration by receiving, from the compiler (122), the compiled source code (128) for execution and compiler warning data (130) describing one or more compiler warnings generated at compile time of the debuggee. The compiler warning data (130) in the example of FIG. 1 is implemented as a symbol table (134) as described above, but need not limited to a symbol table in all embodiments of compiler warning integration. In the compiler warning data (130), each compiler warning resulted from a source code variable statement in the debuggee source code.

The debugger (126), during the debug session receive a (132) request to evaluate a variable, and determines, from the compiler warning data (130), whether evaluating the variable is dependent upon a source code variable statement resulting in a compiler warning. If evaluating the variable is not dependent upon a source code variable statement resulting in a compiler warning, the debugger (126) returns only the result of the evaluation of the variable. If, however, evaluating the variable is dependent upon a source code variable statement resulting in a compiler warning, the debugger (126) in the example of FIG. 1 is configured to returning a compiler warning indicator along with a result of the evaluation.

Also stored in RAM (168) is an operating system (154). Operating systems that support integrating compiler warnings into a debug session according to embodiments of the present invention include UNIX™, Linux™, Microsoft XP™, AIX™, IBM's i5/OS™, and others as will occur to those of skill in the art. The operating system (154), debugger (126), compiler (122), GUI (124), and debuggee (120) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that support integrating compiler warnings into a debug session according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that support integrating compiler warnings into a debug session according to embodiments of the present invention include modems for wired dial-up communications, Ethernet (IEEE 802.3) adapters for wired data communications network communications, and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
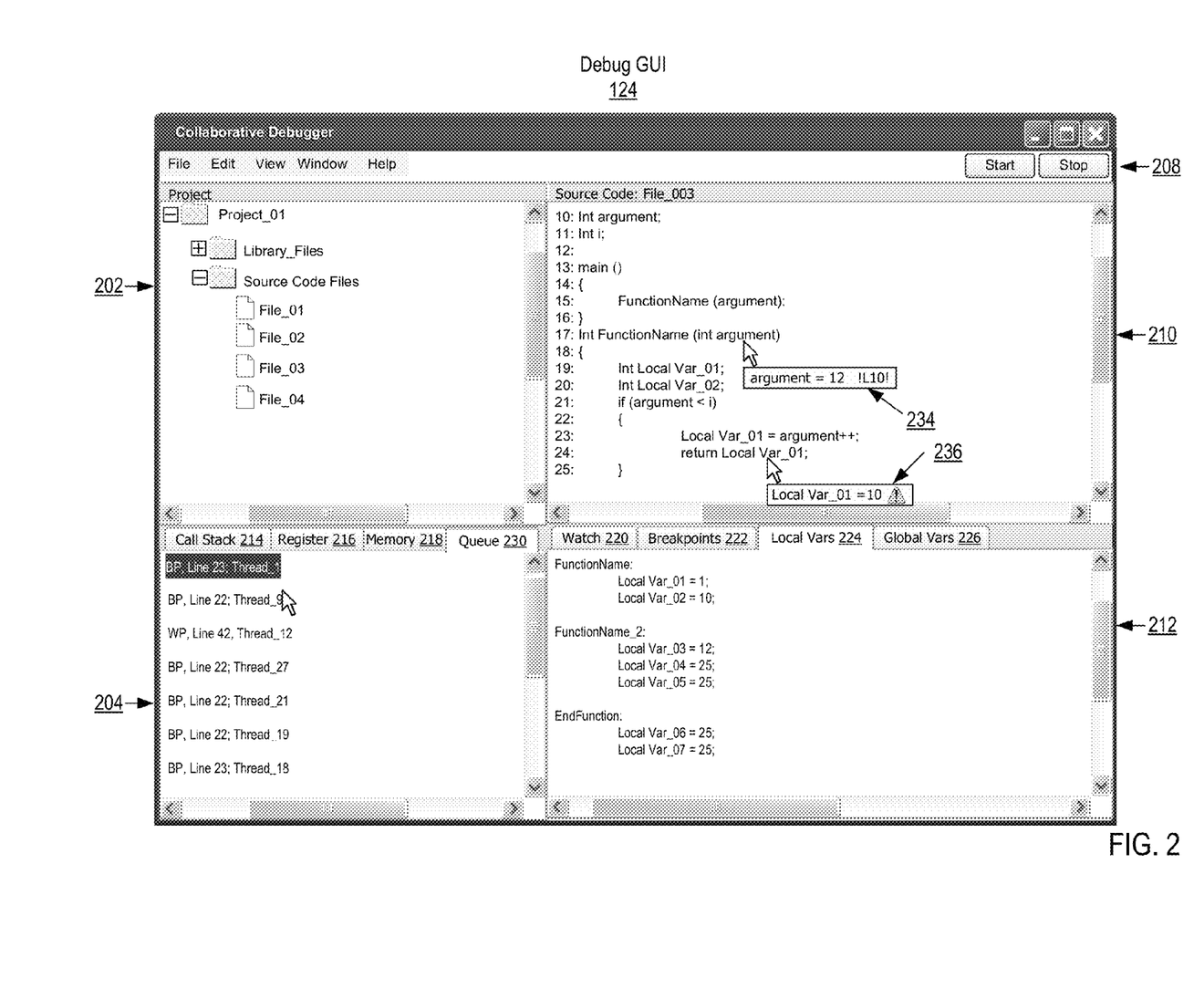
FIG. 2 sets forth an example GUI presented to a user by a debugger in accordance with embodiments of the present invention.

For further explanation, FIG. 2 sets forth an example GUI (124) presented to a user by a debugger in accordance with embodiments of the present invention. The example GUI (124) of FIG. 2 provides an interface for a user to control operation of a debugger and thereby a debuggee. The debugger presenting the example GUI (124) of FIG. 2 is configured for integrating compiler warnings into a debug session in accordance with embodiments of the present invention.

The example GUI (124) of FIG. 2 includes a menu bar (208) that, in turn, includes a number of separate menus: a File menu, an Edit menu, a View menu, and a Help menu. The example GUI (124) of FIG. 2 also includes several independent portions—called panes (as in 'window panes') for clarity of explanation—a project pane (202), a source code pane (210), and two separate data panes (204, 212). Project pane (202) presents the files and resources available in a particular software development project. Source code pane (210) presents the source code of the multi-threaded debuggee. The data panes (204, 212) present various data useful in debugging the source code. In the example of FIG. 2, data pane (204) includes four tabs, each of which presents different data: a call stack tab (214), a register tab (214), a memory tab (218), and an event queue (230) tab. Data pane (212) includes four tabs: a watch list tab (220), a breakpoints (222) tab, a local variable tab (224), and a global variable tab (226).

The example GUI (124) of FIG. 2 sets forth two mouse pointers to depict two different examples, but readers of skill in the art will recognize that in most typical application only one mouse pointer will be presented in the GUI. Each mouse pointer, is positioned over—a hover over—a variable: "argument" or "Local Var_01." Such a hover, as in this example, may cause the GUI (124) to generate and send to the debugger, a command to evaluate the variable. If evaluating the variable is dependent upon a source code variable statement resulting in a compiler warning, as described above with regard to FIG. 1, the debugger returns a compiler warning indicator along with a result of the evaluation. In the example of FIG. 2, the GUI (124) displays a graphical indication (234, 236) of the compiler warning indicator. The example graphical indication (234) of the compiler warning indicator related to the variable "argument" in FIG. 2 includes a line number, L10, of the source code variable statement that resulted in the compiler warning. In some embodiments, this indicator may be a type of hyperlink—once a user clicks on the indicator, GUI will display the source code that includes the source code variable statement that resulted in the compiler warning. The example graphical indication (236) of a compiler warning indicator related to the variable "Local Var_01" is depicted merely as an icon. Again, the icon once clicked upon by a user, may cause the GUI to display the source code variable statement in source code context. The graphical indications (234, 236) may also provide other information related to the compiler warning indicator, such as a detailed description of the compiler warning. Readers will recognize that these are but a few examples of graphical indications of compiler warning indicators. Other various implementations that may occur to readers of skill in the art are well within the scope of the present invention.

The GUI items, menus, window panes, tabs, and so on depicted in the example client-specific GUI (124) of FIG. 2, are for explanation, not for limitation. Other GUI items, menu bar menus, drop-down menus, list-boxes, window panes, tabs, and so on as will occur to readers of skill in the art may be included in GUIs presented by debuggers configured for integrating compiler warnings into a debug session in accordance with embodiments of the present invention.

Figure 3:
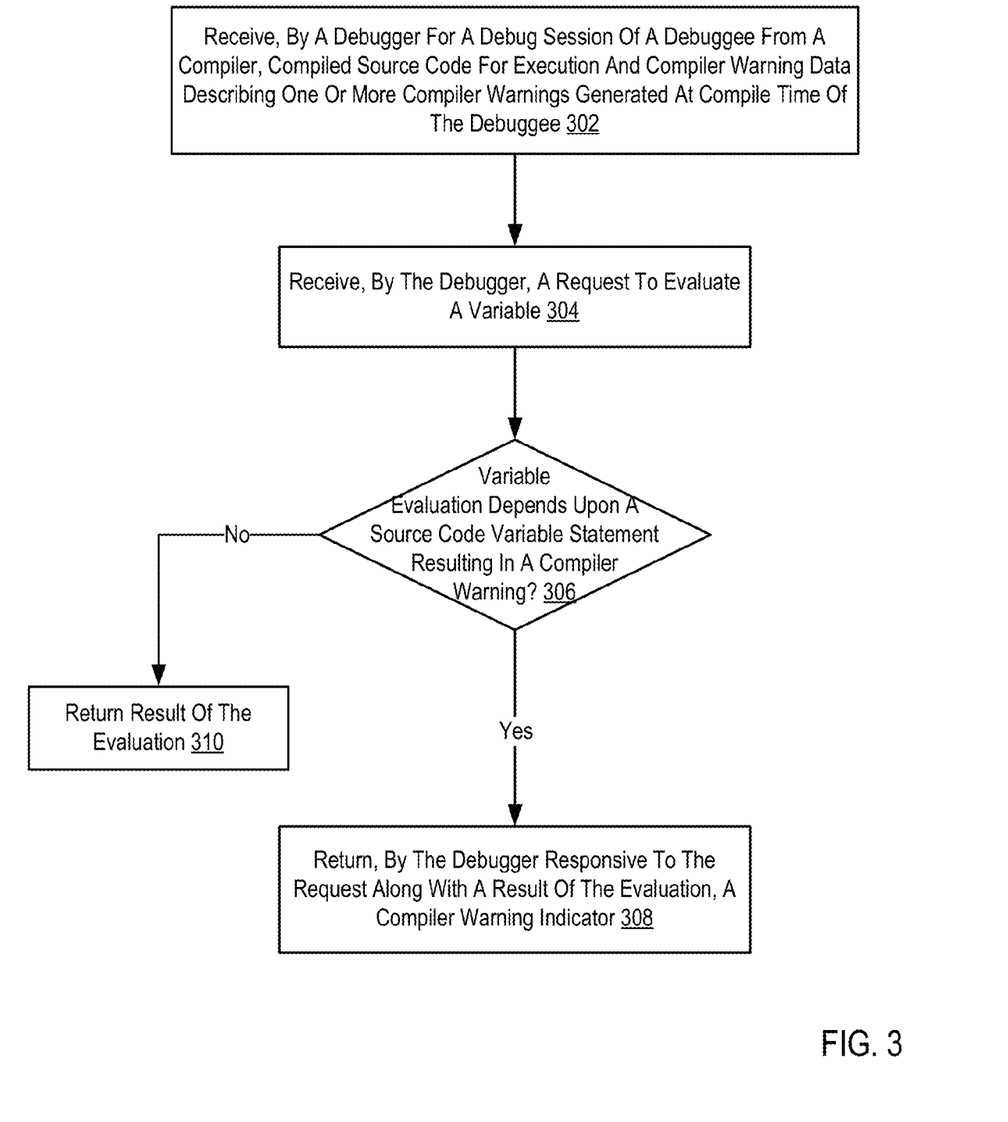
FIG. 3 sets forth a flow chart illustrating an exemplary method for integrating compiler warnings into a debug session according to embodiments of the present invention.

For further explanation, FIG. 3 sets forth a flow chart illustrating an exemplary method for integrating compiler warnings into a debug session according to embodiments of the present invention. The method of FIG. 3 includes receiving (302), by a debugger for a debug session of a debuggee from a compiler, compiled source code for execution and compiler warning data describing one or more compiler warnings generated at compile time of the debuggee. In the method of FIG. 3, each compiler warning results from a source code variable statement in the debuggee source code. Receiving (302) and compiler warning data may include receiving a symbol table that includes the compiler warning data or receiving one or more other data structures that includes the compiler warning data.

The method of FIG. 3 also includes receiving (304), by the debugger, a request to evaluate a variable. Receiving (304) a request to evaluate a variable may be carried out in various ways such as, for example, receiving a command through a command line interface or receiving user device interaction—mouse clicks, keyboard keystrokes, hover-overs, and the like—in a GUI presented by the debugger that represents a request to evaluate a variable.

The method of FIG. 3 also includes determining (306), from the compiler warning data, whether evaluating the variable is dependent upon a source code variable statement resulting in a compiler warning. If evaluating the variable is not dependent upon a source code variable statement resulting in a compiler warning, the method of FIG. 3 continues by returning (310), by the debugger responsive to the request along, a result of the evaluation. If evaluating the variable is dependent upon a source code variable statement resulting in a compiler warning, returning (308), by the debugger responsive to the request along with a result of the evaluation, a compiler warning indicator.

Figure 4:
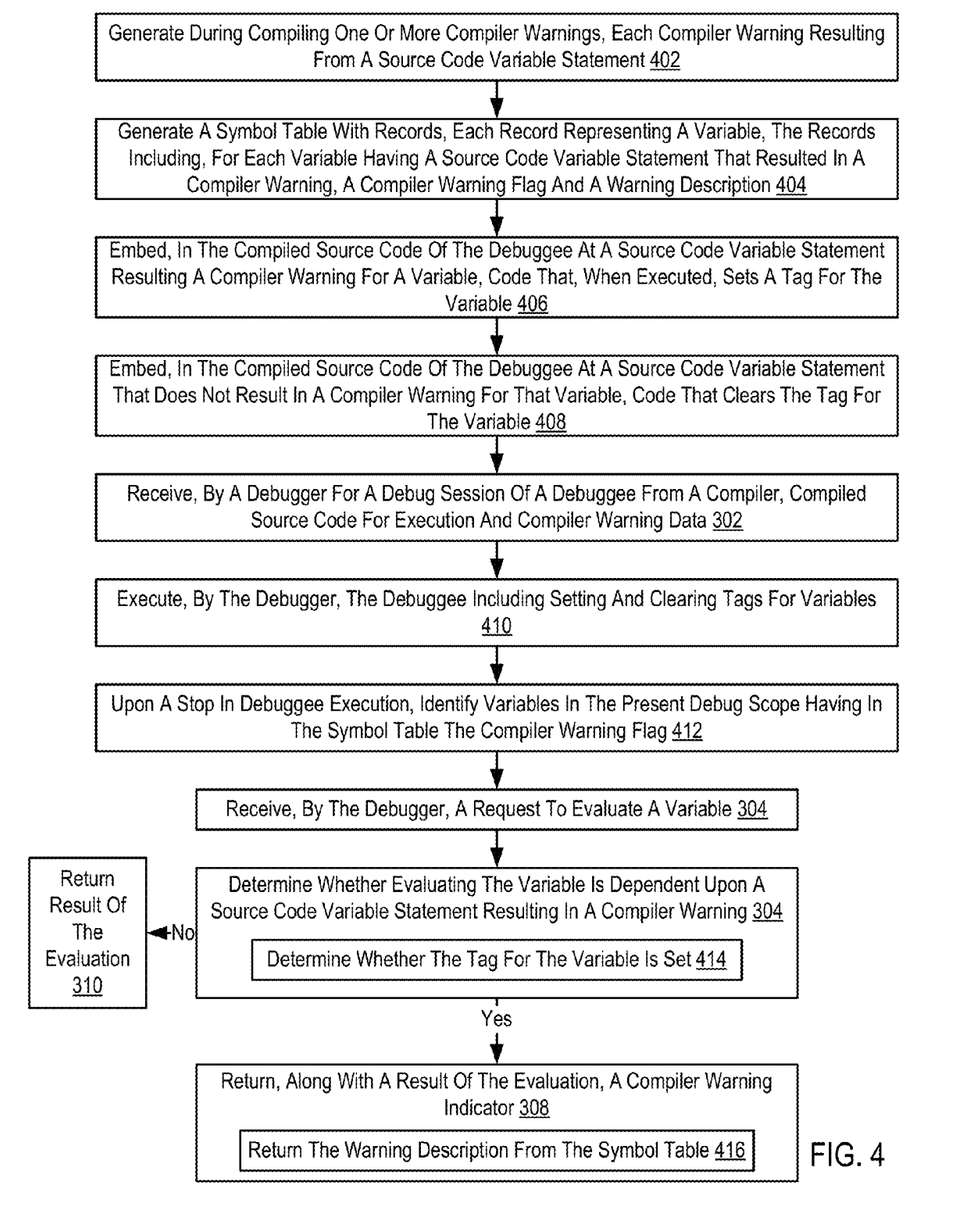
FIG. 4 sets forth a flow chart illustrating a further exemplary method for integrating compiler warnings into a debug session according to embodiments of the present invention.

For further explanation, FIG. 4 sets forth a flow chart illustrating a further exemplary method for integrating compiler warnings into a debug session according to embodiments of the present invention. The method of FIG. 4 is similar to the method of FIG. 3, including as it does: receiving (302), by a debugger for a debug session of a debuggee from a compiler, compiled source code for execution and compiler warning data; receiving (304), by the debugger, a request to evaluate a variable; determining (306), from the compiler warning data, whether evaluating the variable is dependent upon a source code variable statement resulting in a compiler warning; returning (310) only a result of the evaluation if evaluating the variable is not dependent upon a source code variable statement resulting in a compiler warning and returning (308), by the debugger responsive to the request along with a result of the evaluation, a compiler warning indicator if evaluating the variable is dependent upon a source code variable statement resulting in a compiler warning.

The method of FIG. 4 differs from the method of FIG. 3, however, in that the method of FIG. 4 also includes generating (402) during compiling one or more compiler warnings, each compiler warning resulting from a source code variable statement. The compiler in the example of FIG. 4 may continue by generating (404) a symbol table with a number of records. Each record in the symbol table generated (404) by the compiler represents a variable and, for each variable having a source code variable statement that resulted in a compiler warning, the symbol table includes a record that, in turn, includes a compiler warning flag and a warning description. A compiler warning flag may be implemented in any way to indicate that a compiler warning related to the variable was generated during debuggee compile time.

The method of FIG. 4 also includes embedding (406), in the compiled source code of the debuggee at a source code variable statement resulting a compiler warning for a variable, code that, when executed, sets a tag for the variable and embedding (408), in the compiled source code of the debuggee at a source code variable statement that does not result in a compiler warning for that variable, code that clears the tag for the variable. That is, the compiler may add to the original source code of the debuggee, code that sets and clears tags.

The method of FIG. 4 also includes executing (410), by the debugger, the debuggee including setting and clearing tags for variables. That is, while executing (410), the debuggee encounters and executed the embedded code to set and clear tags. Upon a stop in execution of the debuggee—as a result of encountering a breakpoint, for example—the method of FIG. 4 continues by identifying (412) variables in the present debug scope having in the symbol table the compiler warning flag. The present debug scope, may be defined in various ways including, for example, as a function under execution, as a line of source code, as a basic block of code, or as a set of code presently being displayed in a GUI. Within the scope and upon a stop, the debugger determines which variables have a compiler warning flag set. Although a set compiler warning flag indicates that a compiler warning was generated for a source code variable statement relating to the variable, the flag does not and cannot indicate whether that source code variable statement has been encountered in execution of the debuggee to this presently stopped point.

Instead, the tags set and cleared by the compiler embedded code, indicate whether that statement has been encountered. In the method of FIG. 4, determining (304) whether evaluating the variable is dependent upon a source code variable statement resulting in a compiler warning includes determining (414) whether the tag for the variable is set. Said another way, when the debugger receives a request to evaluate a particular one of the variables identified as having a compiler warning flag set, the debugger determines whether—at this stopped point in execution of the debuggee—the source code variable statement that generated the compiler warning relating to the particular variable has been executed by inspecting the tag for the variable.

Also in the method of FIG. 4, returning (308), by the debugger responsive to the request along with a result of the evaluation, a compiler warning indicator includes returning (416) the warning description from the symbol table. That is, in addition to merely indicating a warning, the method of FIG. 4 includes returning a warning description.

Figure 5:
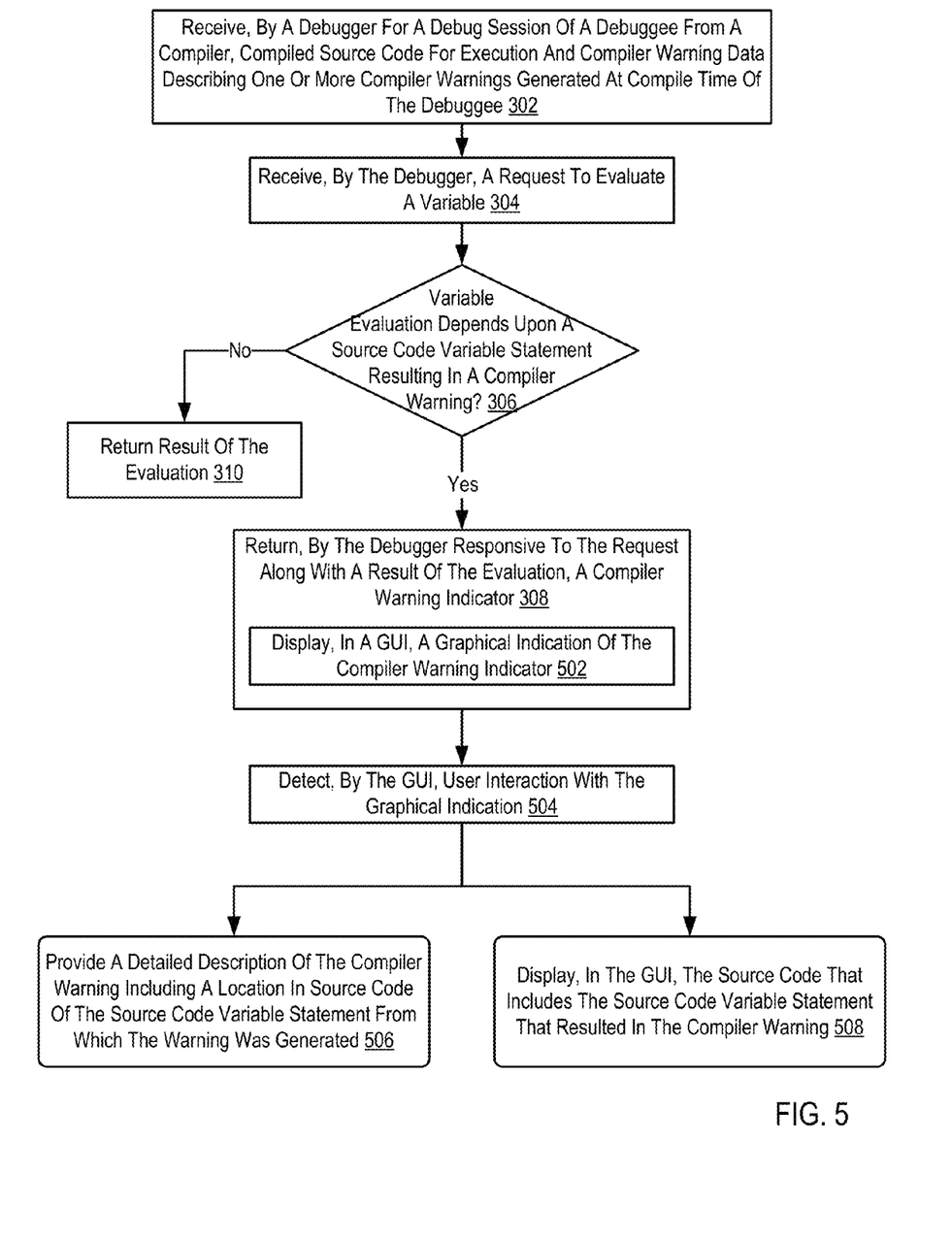
FIG. 5 sets forth a flow chart illustrating a further exemplary method for integrating compiler warnings into a debug session according to embodiments of the present invention.

For further explanation, FIG. 5 sets forth a flow chart illustrating a further exemplary method for integrating compiler warnings into a debug session according to embodiments of the present invention. The method of FIG. 5 is similar to the method of FIG. 3, including as it does: receiving (302), by a debugger for a debug session of a debuggee from a compiler, compiled source code for execution and compiler warning data; receiving (304), by the debugger, a request to evaluate a variable; determining (306), from the compiler warning data, whether evaluating the variable is dependent upon a source code variable statement resulting in a compiler warning; returning (310) only a result of the evaluation if evaluating the variable is not dependent upon a source code variable statement resulting in a compiler warning and returning (308), by the debugger responsive to the request along with a result of the evaluation, a compiler warning indicator if evaluating the variable is dependent upon a source code variable statement resulting in a compiler warning.

The method of FIG. 5 differs from the method of FIG. 3, however, in that in the method of FIG. 5, returning (308) a compiler warning indicator includes displaying (502), in a graphical user interface ('GUI') presented by the debugger, a graphical indication of the compiler warning indicator. As mentioned above with regard to the example GUI (124) of FIG. 2, a graphical indication may be any type of indicator: an icon, text, an image, a sound, and so on. The method of FIG. 5 also includes detecting (504), by the GUI, user interaction with the graphical indication. User interaction may include a mouse-clock, a keyboard keystroke, and so on as will occur to readers of skill in the art.

Responsive to the user interaction, the method of FIG. 5 continues in one of two ways: by providing (506) a detailed description of the compiler warning including a location in source code of the source code variable statement from which the warning was generated or by displaying (508), in the GUI, the source code that includes the source code variable statement that resulted in the compiler warning. Providing (506) a detailed description that includes a location in source code of the source code variable statement may need not cause the GUI to display the actual source of the source code variable statement. Although providing (506) and displaying (508) are depicted in the example of FIG. 5 as optional steps, the steps need not be mutually exclusive. For example, the debugger may provide (506) the detailed description of the compiler warning responsive to user interaction and responsive to further user interaction—such as interaction with the displayed detailed description the debugger may display the source code that includes the source code variable statement that resulted in the compiler warning. As another example, the debugger may provide (506) a detailed description as follows:

Variable=2; Compiler Warning From Line 60.

In some embodiments, the detailed description is a GUI item configured for user interaction, operating as a hyperlink to the location in source code of the source code variable statement that resulted in the compiler warning. The user may click on the detailed description, and the debugger will display line 60 of the source code—the source code that includes the source code variable statement that resulted in the compiler warning, the warning that is the subject of the detailed description.

In this way a compiler and a debugger may support integration of compiler warnings into a debug session in accordance with embodiments of the present invention. Software development may be more thorough and reduce errors encountered during software execution after development.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for integrating compiler warnings into a debug session, the apparatus comprising a computer processor, a computer memory operatively coupled to the computer processor, the computer memory having disposed within it computer program instructions that, when executed by the computer processor, cause the apparatus to carry out the steps of:

generating during compiling one or more compiler warnings, each compiler warning resulting from a source code variable statement;

generating a symbol table with a plurality of records, each record representing a variable, the plurality of records including, for each variable having a source code variable statement that resulted in a compiler warning, a compiler warning flag and a warning description;

embedding, in the compiled source code of the debuggee at a source code variable statement resulting a compiler warning for a variable, code that, when executed, sets a tag for the variable;

embedding, in the compiled source code of the debuggee at a source code variable statement that does not result in a compiler warning for that variable, code that clears the tag for the variable;

receiving, by a debugger for a debug session of a debuggee from a compiler, compiled source code for execution and compiler warning data describing one or more compiler warnings generated at compile time of the debuggee, each compiler warning resulting from a source code variable statement in the debuggee source code;

executing, by the debugger, the debuggee including setting and clearing tags for variables;

upon a stop in execution of the debugee, identifying variables in the present debug scope having in the symbol table the compiler warning flag;

receiving, by the debugger, a request to evaluate a variable; and determining, from the compiler warning data, whether evaluating the variable is dependent upon a source code variable statement resulting in a compiler warning;

if evaluating the variable is dependent upon a source code variable statement resulting in a compiler warning, returning, by the debugger responsive to the request along with a result of the evaluation, a compiler warning indicator.

2. The apparatus of claim 1, wherein:

determining whether evaluating the variable is dependent upon a source code variable statement resulting in a compiler warning further comprises determining whether the tag for the variable is set, and returning, by the debugger responsive to the request along with a result of the evaluation, a compiler warning indicator further comprises returning the warning description from the symbol table.

3. The apparatus of claim 1, wherein returning a compiler warning indicator further comprises:

displaying, in the GUI, a graphical indication of the compiler warning indicator.

4. The apparatus of claim 3, further comprising computer program instructions that, when executed by the computer processor, cause the apparatus to carry out the steps of:

detecting, by the GUI, user interaction with the graphical indication, and responsive to the user interaction, providing a detailed description of the compiler warning including a location in source code of the source code variable statement from which the warning was generated.

5. A computer program product for integrating compiler warnings into a debug session, the computer program product disposed upon a computer readable memory, wherein the computer readable medium is not a signal, the computer program product comprising computer program instructions that, when executed, cause a computer to carry out the steps of:

generating during compiling one or more compiler warnings, each compiler warning resulting from a source code variable statement;

generating a symbol table with a plurality of records, each record representing a variable, the plurality of records including, for each variable having a source code variable statement that resulted in a compiler warning, a compiler warning flag and a warning description;

embedding, in the compiled source code of the debuggee at a source code variable statement resulting a compiler warning for a variable, code that, when executed, sets a tar for the variable;

embedding, in the compiled source code of the debuggee at a source code variable statement that does not result in a compiler warning for that variable, code that clears the tag for the variable;

receiving, by a debugger for a debug session of a debuggee from a compiler, compiled source code for execution and compiler warning data describing one or more compiler warnings generated at compile time of the debuggee, each compiler warning resulting from a source code variable statement in the debuggee source code;

executing, by the debugger, the debuggee including setting and clearing tags for variables;

upon a stop in execution of the debugee, identifying variables in the present debug scope having in the symbol table the compiler warning flag;

receiving, by the debugger, a request to evaluate a variable; and determining, from the compiler warning data, whether evaluating the variable is dependent upon a source code variable statement resulting in a compiler warning;

if evaluating the variable is dependent upon a source code variable statement resulting in a compiler warning, returning, by the debugger responsive to the request along with a result of the evaluation, a compiler warning indicator.

6. The computer program product of claim 5, wherein:

determining whether evaluating the variable is dependent upon a source code variable statement resulting in a compiler warning further comprises determining whether the tag for the variable is set, and returning, by the debugger responsive to the request along with a result of the evaluation, a compiler warning indicator further comprises returning the warning description from the symbol table.

7. The computer program product of claim 5, wherein returning a compiler warning indicator further comprises:

displaying, in the GUI, a graphical indication of the compiler warning indicator.

8. The computer program product of claim 7, further comprising computer program instructions that, when executed, cause the computer to carry out the steps of:

detecting, by the GUI, user interaction with the graphical indication, and responsive to the user interaction, providing a detailed description of the compiler warning including a location in source code of the source code variable statement from which the warning was generated.

9. The computer program product of claim 5 wherein the computer readable medium comprises a storage medium.

* * * * *